United States Patent [19]

Alatalo et al.

[11] Patent Number: 5,570,358

[45] Date of Patent: Oct. 29, 1996

[54] METHOD FOR IMPLEMENTING SWITCHING IN TIME OR SPACE DOMAIN

[75] Inventors: Hannu Alatalo; Marko Kokko, both of Oulu, Finland

[73] Assignee: Nokia Telecommunications Oy, Espoo, Finland

[21] Appl. No.: 373,203

[22] PCT Filed: Jul. 8, 1993

[86] PCT No.: PCT/FI93/00292

§ 371 Date: Mar. 10, 1995

§ 102(e) Date: Mar. 10, 1995

[87] PCT Pub. No.: WO94/03021

PCT Pub. Date: Feb. 3, 1994

[30] Foreign Application Priority Data

Jul. 17, 1992 [FI] Finland .................................. 923297

[51] Int. Cl.⁶ .............................. H04L 12/52; H04L 12/54
[52] U.S. Cl. ................... 370/58.2; 370/60; 370/61
[58] Field of Search .................... 370/58.1, 58.2, 370/58.3, 60, 65.5, 66, 68, 79, 61

[56] References Cited

U.S. PATENT DOCUMENTS

| | | | |
|---|---|---|---|
| 4,320,501 | 3/1982 | Le Diev et al. ..................... | 370/63 |
| 4,471,479 | 9/1984 | Waas ................................. | 370/58 |
| 5,197,063 | 3/1993 | Nakano et al. ................... | 370/58.1 |
| 5,311,506 | 5/1994 | Beisel ............................... | 370/58.1 |

FOREIGN PATENT DOCUMENTS

| | | | |
|---|---|---|---|
| 406191 | 1/1991 | European Pat. Off. ........ | H04Q 11/04 |
| 923296 | 2/1994 | Finland ........................... | H04Q 11/04 |
| 923295 | 2/1994 | Finland ........................... | H04Q 11/04 |
| 3214891 | 9/1991 | Japan .............................. | H04Q 11/04 |
| 2254754 | 10/1992 | United Kingdom ........... | H04Q 11/04 |

*Primary Examiner*—Douglas W. Olms
*Assistant Examiner*—Russell Blum
*Attorney, Agent, or Firm*—Cushman Darby & Cushman, L.L.P.

[57] ABSTRACT

A method for implementing switching in the time or space domain, in which the switching is effected on the basis of switching data contained in an address control memory, and a basic switching block is defined on the basis of an incoming frame structure so that the number of its time slots corresponds to the greatest possible number of signals of the lowest level of hierarchy to be switched in the frame. The basic switching block recurs in the same form with respect to switching. In order for the switching to be simplified: (i) the number of the switching instructions to be stored in the address control memory corresponds to the size of the basic switching block, whereby when the basic switching block also contains higher-level signals, the same switching instruction is used in the address control memory at given intervals, depending on how the signals occur in the basic switching block, (ii) the same address control memory is read during the entire frame structure, whereby it gives a switching instruction to all time slots in the frame, and (iii) the switching instructions read from the address control memory are skipped during the time slots which are not cross-connected.

3 Claims, 7 Drawing Sheets

PAYLOAD

FIG. 7A

| INSTRUCTION WORD NO. | TU-12 | TU-2 | TU-3 |
|---|---|---|---|
| 1 | SW. INSTR./TU-12 #0 | SW. INSTR./TU-2 #0 | SW. INSTR./TU-3 #0 |
| 2 | SW. INSTR./TU-12 #1 | SW. INSTR./TU-2 #1 | SW. INSTR./TU-3 #1 |
| 3 | SW. INSTR./TU-12 #2 | SW. INSTR./TU-2 #2 | SW. INSTR./TU-3 #2 |
| 4 | SW. INSTR./TU-12 #3 | SW. INSTR./TU-2 #3 | SW. INSTR./TU-3 #0 |
| 5 | SW. INSTR./TU-12 #4 | SW. INSTR./TU-2 #4 | SW. INSTR./TU-3 #1 |
| 6 | SW. INSTR./TU-12 #5 | SW. INSTR./TU-2 #5 | SW. INSTR./TU-3 #2 |
| 7 | SW. INSTR./TU-12 #6 | SW. INSTR./TU-2 #6 | SW. INSTR./TU-3 #0 |
| 8 | SW. INSTR./TU-12 #7 | SW. INSTR./TU-2 #7 | SW. INSTR./TU-3 #1 |
| 9 | SW. INSTR./TU-12 #8 | SW. INSTR./TU-2 #8 | SW. INSTR./TU-3 #2 |
| 10 | SW. INSTR./TU-12 #9 | SW. INSTR./TU-2 #9 | SW. INSTR./TU-3 #0 |
| 11 | SW. INSTR./TU-12 #10 | SW. INSTR./TU-2 #10 | SW. INSTR./TU-3 #1 |
| 12 | SW. INSTR./TU-12 #11 | SW. INSTR./TU-2 #11 | SW. INSTR./TU-3 #2 |
| 13 | SW. INSTR./TU-12 #12 | SW. INSTR./TU-2 #12 | SW. INSTR./TU-3 #0 |
| 14 | SW. INSTR./TU-12 #13 | SW. INSTR./TU-2 #13 | SW. INSTR./TU-3 #1 |
| 15 | SW. INSTR./TU-12 #14 | SW. INSTR./TU-2 #14 | SW. INSTR./TU-3 #2 |
| 16 | SW. INSTR./TU-12 #15 | SW. INSTR./TU-2 #15 | SW. INSTR./TU-3 #0 |
| 17 | SW. INSTR./TU-12 #16 | SW. INSTR./TU-2 #16 | SW. INSTR./TU-3 #1 |
| 18 | SW. INSTR./TU-12 #17 | SW. INSTR./TU-2 #17 | SW. INSTR./TU-3 #2 |
| 19 | SW. INSTR./TU-12 #18 | SW. INSTR./TU-2 #18 | SW. INSTR./TU-3 #0 |
| 20 | SW. INSTR./TU-12 #19 | SW. INSTR./TU-2 #19 | SW. INSTR./TU-3 #1 |
| 21 | SW. INSTR./TU-12 #20 | SW. INSTR./TU-2 #20 | SW. INSTR./TU-3 #2 |
| 22 | SW. INSTR./TU-12 #21 | SW. INSTR./TU-2 #0 | SW. INSTR./TU-3 #0 |
| 23 | SW. INSTR./TU-12 #22 | SW. INSTR./TU-2 #1 | SW. INSTR./TU-3 #1 |
| 24 | SW. INSTR./TU-12 #23 | SW. INSTR./TU-2 #2 | SW. INSTR./TU-3 #2 |
| 25 | SW. INSTR./TU-12 #24 | SW. INSTR./TU-2 #3 | SW. INSTR./TU-3 #0 |
| 26 | SW. INSTR./TU-12 #25 | SW. INSTR./TU-2 #4 | SW. INSTR./TU-3 #1 |
| 27 | SW. INSTR./TU-12 #26 | SW. INSTR./TU-2 #5 | SW. INSTR./TU-3 #2 |
| 28 | SW. INSTR./TU-12 #27 | SW. INSTR./TU-2 #6 | SW. INSTR./TU-3 #0 |
| 29 | SW. INSTR./TU-12 #28 | SW. INSTR./TU-2 #7 | SW. INSTR./TU-3 #1 |
| 30 | SW. INSTR./TU-12 #29 | SW. INSTR./TU-2 #8 | SW. INSTR./TU-3 #2 |
| 31 | SW. INSTR./TU-12 #30 | SW. INSTR./TU-2 #9 | SW. INSTR./TU-3 #0 |
| 32 | SW. INSTR./TU-12 #31 | SW. INSTR./TU-2 #10 | SW. INSTR./TU-3 #1 |
| 33 | SW. INSTR./TU-12 #32 | SW. INSTR./TU-2 #11 | SW. INSTR./TU-3 #2 |

| | | |
|---|---|---|
| | | SW. INSTR./ TU-3 #0 |
| | | SW. INSTR./ TU-3 #1 |
| | | SW. INSTR./ TU-3 #2 |
| | | SW. INSTR./ TU-3 #0 |
| | | SW. INSTR./ TU-3 #1 |
| | | SW. INSTR./ TU-3 #2 |
| | | SW. INSTR./ TU-3 #0 |
| | | SW. INSTR./ TU-3 #1 |
| | | SW. INSTR./ TU-3 #2 |
| | | SW. INSTR./ TU-3 #0 |
| | | SW. INSTR./ TU-3 #1 |
| | | SW. INSTR./ TU-3 #2 |
| | | SW. INSTR./ TU-3 #0 |
| | | SW. INSTR./ TU-3 #1 |
| | | SW. INSTR./ TU-3 #2 |
| | | SW. INSTR./ TU-3 #0 |
| | | SW. INSTR./ TU-3 #1 |
| | | SW. INSTR./ TU-3 #2 |
| | | SW. INSTR./ TU-3 #0 |
| | | SW. INSTR./ TU-3 #1 |
| | | SW. INSTR./ TU-3 #2 |
| | | SW. INSTR./ TU-3 #0 |
| | | SW. INSTR./ TU-3 #1 |
| | | SW. INSTR./ TU-3 #2 |
| | | SW. INSTR./ TU-3 #0 |
| | | SW. INSTR./ TU-3 #1 |
| | | SW. INSTR./ TU-3 #2 |
| | | SW. INSTR./ TU-3 #0 |
| | | SW. INSTR./ TU-3 #1 |
| | | SW. INSTR./ TU-3 #2 |

| | | |
|---|---|---|
| 34 | SW. INSTR./ TU-12 #33 | SW. INSTR./ TU-2 #12 |
| 35 | SW. INSTR./ TU-12 #34 | SW. INSTR./ TU-2 #13 |
| 36 | SW. INSTR./ TU-12 #35 | SW. INSTR./ TU-2 #14 |
| 37 | SW. INSTR./ TU-12 #36 | SW. INSTR./ TU-2 #15 |
| 38 | SW. INSTR./ TU-12 #37 | SW. INSTR./ TU-2 #16 |
| 39 | SW. INSTR./ TU-12 #38 | SW. INSTR./ TU-2 #17 |
| 40 | SW. INSTR./ TU-12 #39 | SW. INSTR./ TU-2 #18 |
| 41 | SW. INSTR./ TU-12 #40 | SW. INSTR./ TU-2 #19 |
| 42 | SW. INSTR./ TU-12 #41 | SW. INSTR./ TU-2 #20 |
| 43 | SW. INSTR./ TU-12 #42 | SW. INSTR./ TU-2 #0 |
| 44 | SW. INSTR./ TU-12 #43 | SW. INSTR./ TU-2 #1 |
| 45 | SW. INSTR./ TU-12 #44 | SW. INSTR./ TU-2 #2 |
| 46 | SW. INSTR./ TU-12 #45 | SW. INSTR./ TU-2 #3 |
| 47 | SW. INSTR./ TU-12 #46 | SW. INSTR./ TU-2 #4 |
| 48 | SW. INSTR./ TU-12 #47 | SW. INSTR./ TU-2 #5 |
| 49 | SW. INSTR./ TU-12 #48 | SW. INSTR./ TU-2 #6 |
| 50 | SW. INSTR./ TU-12 #49 | SW. INSTR./ TU-2 #7 |
| 51 | SW. INSTR./ TU-12 #50 | SW. INSTR./ TU-2 #8 |
| 52 | SW. INSTR./ TU-12 #51 | SW. INSTR./ TU-2 #9 |
| 53 | SW. INSTR./ TU-12 #52 | SW. INSTR./ TU-2 #10 |
| 54 | SW. INSTR./ TU-12 #53 | SW. INSTR./ TU-2 #11 |
| 55 | SW. INSTR./ TU-12 #54 | SW. INSTR./ TU-2 #12 |
| 56 | SW. INSTR./ TU-12 #55 | SW. INSTR./ TU-2 #13 |
| 57 | SW. INSTR./ TU-12 #56 | SW. INSTR./ TU-2 #14 |
| 58 | SW. INSTR./ TU-12 #57 | SW. INSTR./ TU-2 #15 |
| 59 | SW. INSTR./ TU-12 #58 | SW. INSTR./ TU-2 #16 |
| 60 | SW. INSTR./ TU-12 #59 | SW. INSTR./ TU-2 #17 |
| 61 | SW. INSTR./ TU-12 #60 | SW. INSTR./ TU-2 #18 |
| 62 | SW. INSTR./ TU-12 #61 | SW. INSTR./ TU-2 #19 |
| 63 | SW. INSTR./ TU-12 #62 | SW. INSTR./ TU-2 #20 |

FIG. 7B

SW.INSTR. = Switching instruction

FIG. 8

SW.INSTR. = Switching instruction

| INSTRUCTION WORD NO. | TU-12/-2/-3 |
|---|---|
| 1 | SW. INSTR./ TU-3 #0 |
| 2 | SW. INSTR./ TU-2 #1 |
| 3 | SW. INSTR./ TU-12 #2 |
| 4 | SW. INSTR./ TU-3 #0 |
| 5 | SW. INSTR./ TU-12 #4 |
| 6 | SW. INSTR./ TU-12 #5 |
| 7 | SW. INSTR./ TU-3 #0 |
| 8 | SW. INSTR./ TU-12 #7 |
| 9 | SW. INSTR./ TU-12 #8 |
| 10 | SW. INSTR./ TU-3 #0 |
| 11 | SW. INSTR./ TU-12 #10 |
| 12 | SW. INSTR./ TU-12 #11 |
| 13 | SW. INSTR./ TU-3 #0 |
| 14 | SW. INSTR./ TU-12 #13 |
| 15 | SW. INSTR./ TU-12 #14 |
| 16 | SW. INSTR./ TU-3 #0 |
| 17 | SW. INSTR./ TU-12 #16 |
| 18 | SW. INSTR./ TU-12 #17 |
| 19 | SW. INSTR./ TU-3 #0 |
| 20 | SW. INSTR./ TU-12 #19 |
| 21 | SW. INSTR./ TU-12 #20 |
| 22 | SW. INSTR./ TU-3 #0 |
| 23 | SW. INSTR./ TU-2 #1 |
| 24 | SW. INSTR./ TU-3 #0 |
| 25 | SW. INSTR./ TU-12 #23 |
| 26 | SW. INSTR./ TU-12 #25 |
| 27 | SW. INSTR./ TU-12 #26 |
| 28 | SW. INSTR./ TU-3 #0 |
| 29 | SW. INSTR./ TU-12 #28 |
| 30 | SW. INSTR./ TU-12 #29 |
| 31 | SW. INSTR./ TU-3 #0 |
| 32 | SW. INSTR./ TU-12 #31 |
| 33 | SW. INSTR./ TU-12 #32 |
| 34 | SW. INSTR./ TU-3 #0 |
| 35 | SW. INSTR./ TU-12 #34 |
| 36 | SW. INSTR./ TU-12 #35 |
| 37 | SW. INSTR./ TU-3 #0 |
| 38 | SW. INSTR./ TU-12 #37 |
| 39 | SW. INSTR./ TU-12 #38 |
| 40 | SW. INSTR./ TU-3 #0 |
| 41 | SW. INSTR./ TU-12 #40 |
| 42 | SW. INSTR./ TU-12 #41 |
| 43 | SW. INSTR./ TU-3 #0 |
| 44 | SW. INSTR./ TU-2 #1 |
| 45 | SW. INSTR./ TU-12 #44 |
| 46 | SW. INSTR./ TU-3 #0 |
| 47 | SW. INSTR./ TU-12 #46 |
| 48 | SW. INSTR./ TU-12 #47 |
| 49 | SW. INSTR./ TU-3 #0 |
| 50 | SW. INSTR./ TU-12 #49 |
| 51 | SW. INSTR./ TU-12 #50 |
| 52 | SW. INSTR./ TU-3 #0 |
| 53 | SW. INSTR./ TU-12 #52 |
| 54 | SW. INSTR./ TU-12 #53 |
| 55 | SW. INSTR./ TU-3 #0 |
| 56 | SW. INSTR./ TU-12 #55 |
| 57 | SW. INSTR./ TU-12 #56 |
| 58 | SW. INSTR./ TU-3 #0 |
| 59 | SW. INSTR./ TU-12 #58 |
| 60 | SW. INSTR./ TU-12 #59 |
| 61 | SW. INSTR./ TU-3 #0 |
| 62 | SW. INSTR./ TU-12 #61 |
| 63 | SW. INSTR./ TU-12 #62 |

METHOD FOR IMPLEMENTING SWITCHING IN TIME OR SPACE DOMAIN

BACKGROUND OF THE INVENTION

The invention relates to a method for implementing switching in the time domain, and to a method for implementing switching in the space domain, for signals of several different levels of hierarchy, the signals having a common frame structure. An example of such a frame structure is the frame structure of an STM-1 signal used in the SDH system; this frame structure will be illustrated in greater detail below.

The method of the invention can thus be used in both time and space switches. In this connection, the term time switch refers to a device capable of switching the contents of any time slot in the frame structure of an incoming signal to any time slot in an outgoing frame structure (switching in time). In addition to a time switch, this device can also be called a time slot interchanger. The term space switch, in turn, refers to a switch capable of connecting any incoming line to any outgoing line (switching in space).

In known switching methods, the switching of e.g. the tributary unit groups (TU-12, TU-2, TU-3) of an STM-1 frame is implemented by giving switching instructions separately to 3, 21 or 63 columns by starting the switching from column 13 on TU-3 level and from column 19 on TU-2 and TU-12 levels. It has thus been possible to effect the switching on one level at a time. Another way has been to switch columns 19 to 270 in blocks of 63 columns, and to give switching instructions separately to columns 13 to 18 on the TU-3 level. In this way it has been possible to effect cross-connection on all three of the levels at the same time.

The drawback of the known switching methods is, however, that, in practice they entail fairly complicated equipment.

SUMMARY OF THE INVENTION

The object of the present invention is to remedy the drawback described above.

The idea of the invention is to utilize the frame structure of an incoming signal by defining a basic switching block, which recurs in the frame structure in the same form from the point of view of switching, and to effect the switching of all time slots merely on the basis of an address control memory intended for the switching of the basic switching block by reading the said memory cyclically, and by skipping the switching instructions at the time slots which are not cross-connected.

Owing to the solution of the invention, it is not necessary to inform the actual switch about the level of the signals to be cross-connected. The solution thus allows the practical equipment to be implemented in a more simplified manner than before.

BRIEF DESCRIPTION OF THE DRAWINGS

In the following, the invention will be described in more detail with reference to the examples which are based on an STM-1 signal and illustrated in the attached drawings, in which FIG. 8 shows how the switching instructions of the address control memory in the time switch of the invention are distributed to the channels of different levels of hierarchy in a case where signals of three different levels of hierarchy are switched simultaneously.

DETAILED DESCRIPTION

Figure 1:
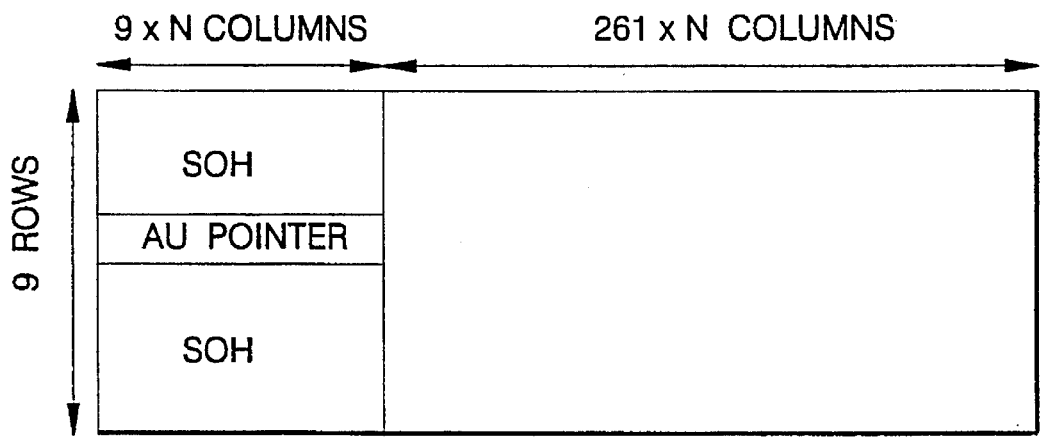
FIG. 1 shows the basic structure of a single STM-N frame.
Figure 2:
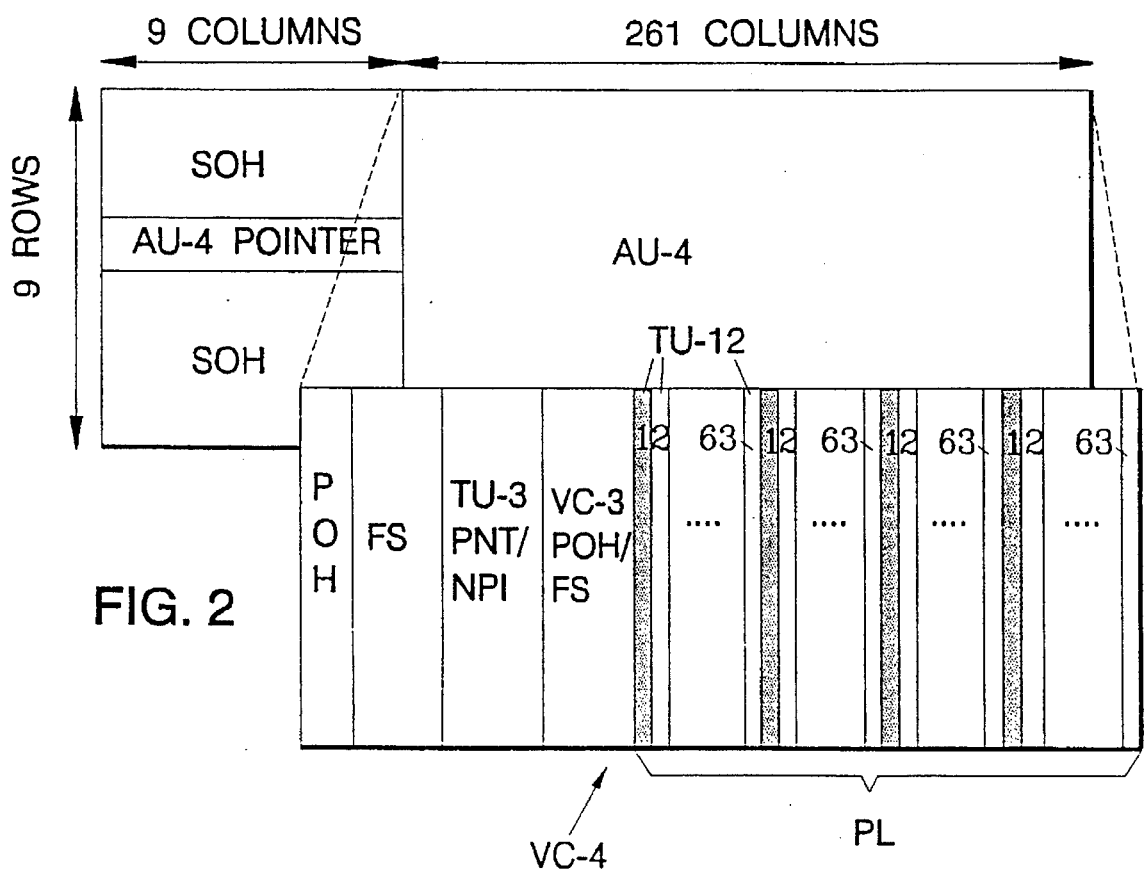
FIG. 2 shows the structure of a single STM-1 frame.

FIG. 1 illustrates the structure of an STM-N frame used in the SDH network, and FIG. 2 illustrates a single STM-1 frame. The STM-N frame comprises a matrix with 9 rows and N×270 columns so that there is one byte at the junction point between each row and the column. Rows 1–3 and rows 5–9 of the N×9 first columns comprise a section overhead SOH, and row 4 comprises an AU pointer. The rest of the frame structure is formed of a section having the length of N×261 columns and containing the payload section of the STM-N frame.

FIG. 2 illustrates a single STM-1 frame which is 270 bytes in length, as described above. The payload section comprises one or more administration units AU. In the example shown in the figure, the payload section consists of the administration unit AU-4, into which a highest-level virtual container VC-4 is inserted. (Alternatively, the STM-1 transfer frame may contain three AU-3 units, each containing a corresponding lower-level virtual container VC-3). The VC-4 in turn consists of a path overhead POH located at the beginning of each row and having the length of one byte (9 bytes altogether), fixed stuff FS located at the following two columns, TU-3 pointers or a null pointer indicator NPI located at the following three columns, fixed stuff or VC-3 path overheads (VC-3 POH) located at the following three columns, and the actual payload section PL. The null pointer indicator NPI is used to separate the tributary unit groups TUG-3 comprising TU-3 units from the tributary unit groups TUG-3 comprising TU-2 units.

Figure 3:
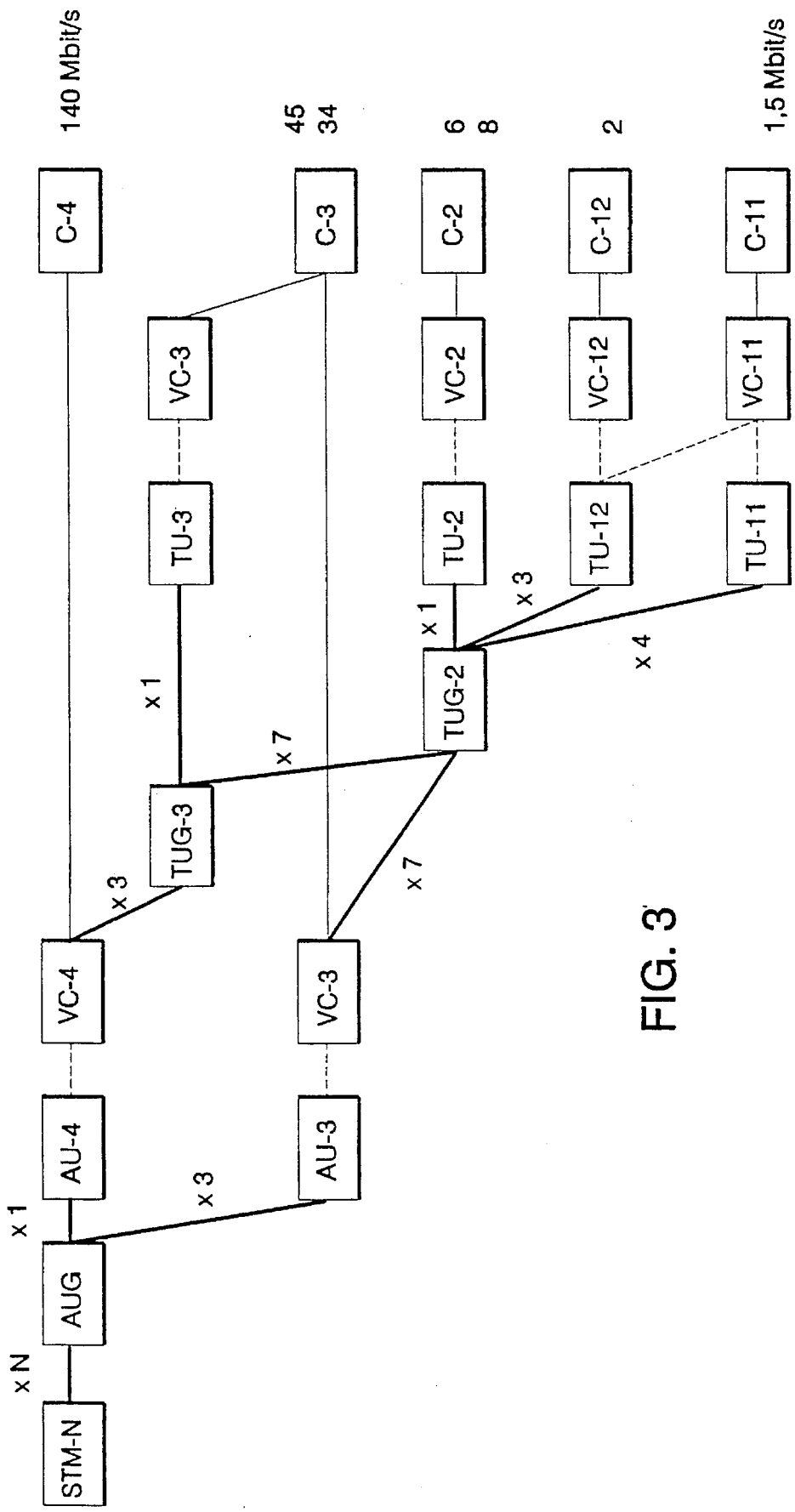
FIG. 3 shows the assembly of the STM-N frame from existing PCM systems.

FIG. 3 shows how the STM-N frame can be formed of existing bit streams. These bit streams (1.5, 2, 6, 8, 34, 45 or 140 Mbit/s, shown on the right in the figure) are packed at the first stage into containers C specified by CCITT. At the second stage, overhead bytes containing control data are inserted into the containers, thus obtaining the above-described virtual container VC-11, VC-12, VC-2, VC-3 or VC-4 (the first suffix in the abbreviations represents the level of hierarchy and the second suffix represents the bit rate). This virtual container remains intact while it passes through the synchronous network up to its point of delivery. Depending on the level of hierarchy, the virtual containers are further formed either into so-called tributary units TU or into AU units (AU-3 and AU-4) already mentioned above by providing them with pointers. The AU unit can be mapped directly into the STM-1 frame, whereas the TU units have to be assembled through tributary unit groups TUG and VC-3 and VC-4 units to form AU units which then can be mapped into the STM-1 frame. In FIG. 3, the mapping is indicated by a continuous thin line, the aligning with a broken line, and the multiplexing with a continuous thicker line.

As is to be seen from FIG. 3, the STM-1 frame may be assembled in a number of alternative ways, and the contents of the highest-level virtual container VC-4, for instance, may vary, depending on the level from which the assembly has been started and in which way the assembly has been performed. The STM-1 signal may thus contain, e.g., 3 TU-3 units or 21 TU-2 units or 63 TU-12 units (or an arbitrary combination of some of the above-mentioned units). As the higher-level unit contains several lower-level units, e.g. the VC-4 unit contains TU-12 units (there are 63 such units in a single VC-4 unit, cf. FIG. 3), the lower-level units are mapped into the higher-level frame by interleaving so that the first bytes are first taken consecutively from each one of the lower-level units, then the second bytes, etc. Accordingly, when the VC-4 signal contains, e.g., the above-mentioned 63 TU-12 signals, these signals are located in the VC-4 frame as shown in FIG. 2, i.e. the first byte of the first TU-12 signal is located first, then the first byte of the second TU-12 signal, etc. After the first byte of the last signal, i.e. the 63rd TU-12 signal, the second byte of the first TU-12 signal follows, etc.

The following table shows the contents of the columns of the STM-1 frame as a summary, depending on whether the frame contains TU-12, TU-2 or TU-3 units.

| Column Number | TU-12 | TU-2 | TU-3 |
| --- | --- | --- | --- |
| 1–9 | SOH | SOH | SOH |
| 10 | VC-4 POH | VC-4 POH | VC-4 POH |
| 11–12 | fixed stuff | fixed stuff | fixed stuff |
| 13–15 | NPI | NPI | TU-3 pointers |
| 16–18 | fixed stuff | fixed stuff | VC-3 POH |
| 19–81 | 1 × 63 × TU-12 | 3 × 21 × TU-2 | 21 × 3 × TU-3 |
| 82–144 | 1 × 63 × TU-12 | 3 × 21 × TU-2 | 21 × 3 × TU-3 |
| 145–207 | 1 × 63 × TU-12 | 3 × 21 × TU-2 | 21 × 3 × TU-3 |
| 208–270 | 1 × 63 × TU-12 | 3 × 21 × TU-2 | 21 × 3 × TU-3 |

The SDH system is described more closely, e.g., in References [1] to [3] (these references being listed at the end of the specification).

Figure 4:
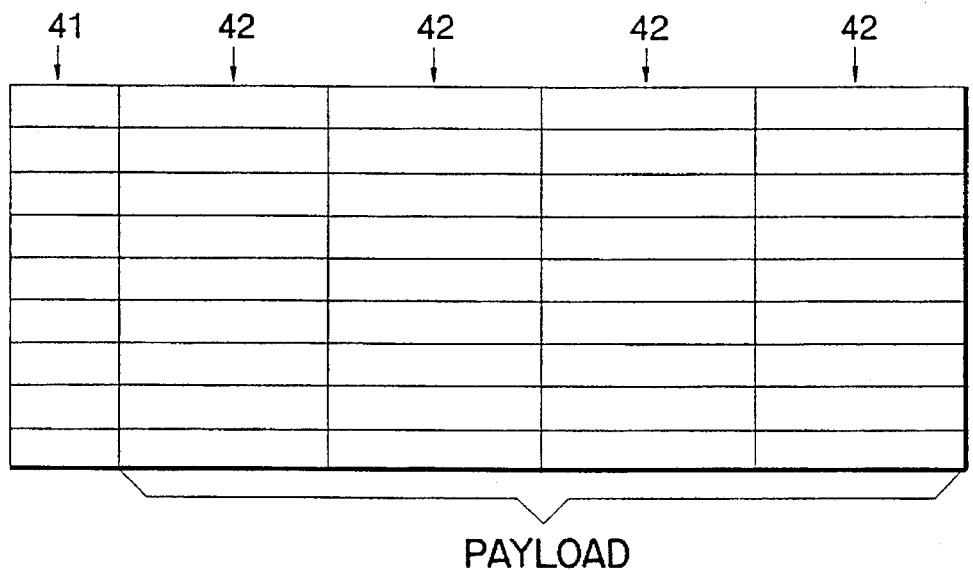
FIG. 4 shows an STM-1 frame and blocks of different sizes contained in it.

On the basis of the above, the frame of the STM-1 signal can be illustrated with respect to the switching as shown in FIG. 4. It consists of blocks of two types: e.g. the first 18 bytes, consisting of section and path overheads, on each row form the first block 41, and the following 63 bytes on each row form the second block 42, of which there are four successive ones in a single STM-1 frame 4. The data contained in the first block are not cross-connected (except for columns 13 to 18 in the case of TU-3 signals), but it continues in the same time slots even in the outgoing frame.

Figure 5:
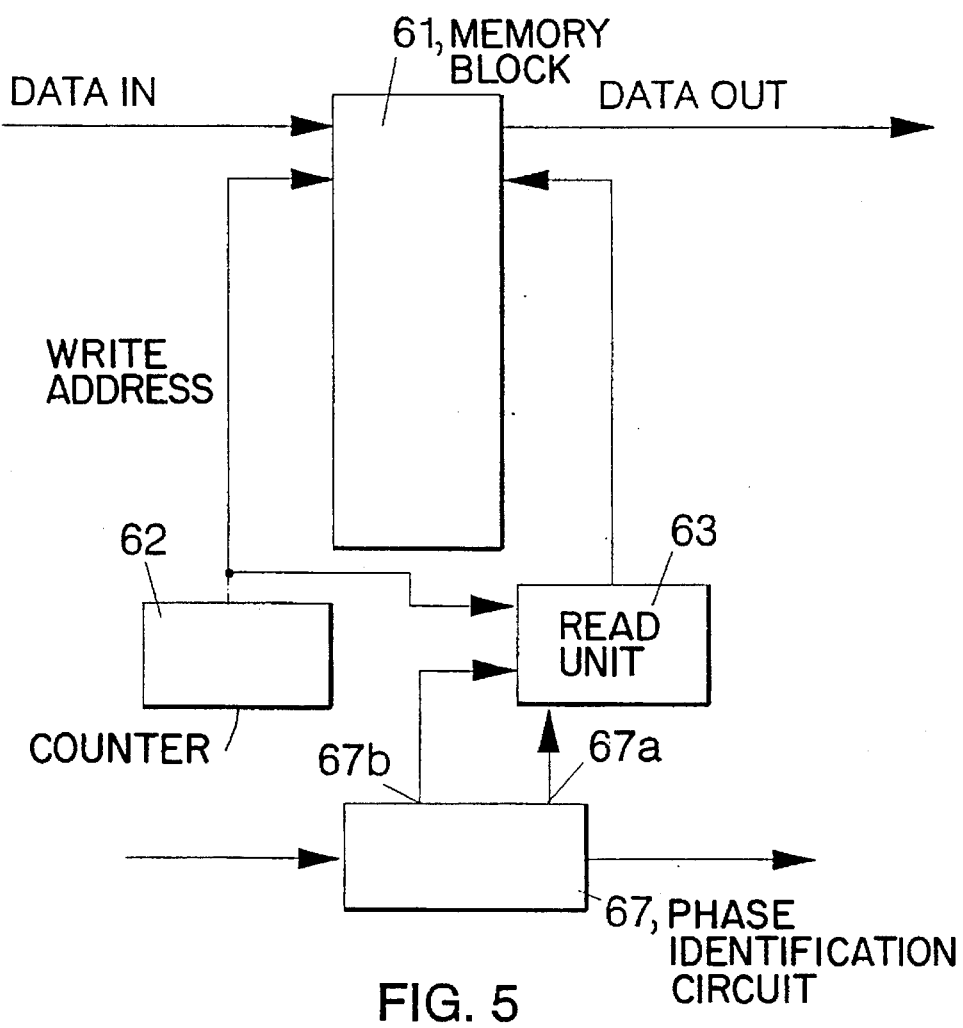
FIG. 5 shows a time switch and implementation of time switching according to the invention.
Figure 6:
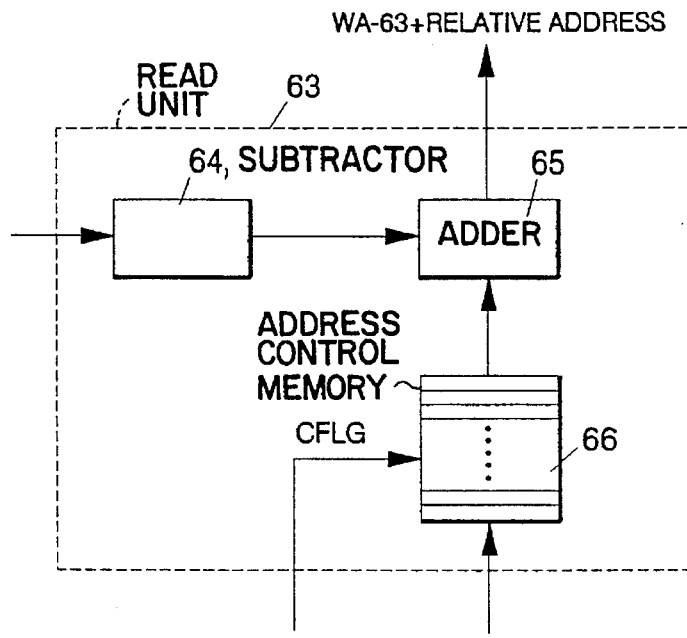
FIG. 6 is a more detailed view of the read unit of the time switch shown in FIG. 5, FIG. 7A and 7B show how the switching instructions of the address control memory in the time switch of the invention are distributed to the different channels in three separate cases.

FIGS. 5 and 6 show the solution of the invention in connection with time switching. FIG. 5 is a block diagram illustrating the structure of the time switch, and FIG. 6 is a more detailed view of the read unit 63 shown in FIG. 5. The time switch shown in this example is the object of copending Finnish Patent Applications No. 923295 and 923296, filed Jul. 17, 1992. However, the method of the invention can also be used in conventional time switches.

The time switch (FIG. 5) comprises only one memory block 61, which is twice as large as the largest frame block.

In this case the size of the memory block 61 is thus 126 bytes. Writing into the memory is controlled by a simple counter 62, which is not in synchronization with the incoming signal frame (but is in synchronization with the clock signal), and which counts continuously from 1 to 126. The bytes of an incoming signal containing frame blocks of different sizes are written continuously into the memory at the address WA given by the counter, this address being incremented by one for each byte. The writing is effected without synchronization with the incoming signal frame, i.e. starting from an arbitrary location in the frame.

The write address WA given by the counter 62 is also supplied to a read unit 63, more specifically to a subtractor circuit 64 therein (FIG. 6), which generates the delay by subtracting the value 63 from the write address (in this case the cross-connection delay has the length of 63 bytes, and in general, it is as long as the duration of the largest frame block in bytes). The read address thus obtained is supplied to an adder circuit 65, which adds the read address to the switching data obtained from the address control memory 66.

The above-described basic structure of the STM-1 frame allows TU-2/3 signals to be switched as if they were made of TU-12 signals. This can be done by defining 63 consecutive bytes of the STM-1 frame as a basic switching block. Since all of these blocks (columns 19–81, 82–144, 145–207 and 208–270 in the STM-1 frame) are switched in the same manner, it is not necessary to define more than one switching matrix for them. The address control memory thus has the length of 63 memory locations, it is read cyclically in the manner described above, and it gives cross-connection data to each time slot of said blocks so that each TU-12 channel has its own switching instruction, or each TU-2 channel has three similar switching instructions, or each TU-3 channel has 21 similar switching instructions.

In this example, a relative read address is used as the switching data in the address control memory. This means that the switching data at each memory location in the address control memory indicates the relative transition of the data contained in the time slot within the frame structure. The relative address is positive if the signal leaves the time switch in a relatively earlier time slot than it came in, and negative in the opposite case. A relative address can have (integer) values between −62 and +62, but not, however, in every time slot; each time slot has its own acceptable range within which the relative read address can be. The first time slot of each row of each frame block 42 can thus have only positive address values (from 0 to +62), the second time slot can have address values from −1 to +61, etc., and the last time slot can have only negative values and zero, i.e. address values from 0 to −62 (all of the above-mentioned lowest and highest values included). The use of the relative read address is described more closely in the above-mentioned Finnish Patent Applications which are referred to for a more detailed description.

As the multiplexing of tributary unit groups of different levels of hierarchy is based on byte interleaving, columns 19, 22, 25 ... 268 form the first TU-3 unit, columns 20, 23, 26 ... 269 form the second TU-3 unit, and columns 21, 24, 27 ... 270 form the third TU-3 unit, or correspondingly the first, second and third TUG-3 unit, which contains TU-2 and/or TU-12 units (cf. FIG. 3). So, for example, switching instruction words (memory locations) 1, 4, 7, 10, 13 ... 61 give the switching instruction to the first TU-3 channel, instruction words 2, 5, 8, 11, 14 ... 62 give it to the second TU-3 channel, and instruction words 3, 6, 9, 12, 15 ... 63 give it to the third TU-3 channel. FIG. 7 illustrates how the switching instruction words (memory locations) of the address control memory are connected with the different channels in cases where the STM-1 frame contains (i) only TU-12 units, (ii) only TU-2 units, and (iii) only TU-3 units.

The address control memory receives information on the phase of the frame from an output 67a of a phase identification circuit 67. A column flag CFLG, which provides information on when columns 1 to 12 are in progress in the frame, is obtained from another output 67b of the phase identification circuit 67. When this flag is valid (during these columns), the output of the address control memory is forced to become zero, i.e. during these columns the adder circuit 65 is not given cross-connection data. On account of the relative address being zero, the data in the columns passes "straight" through the switch (i.e. leaves the switch in the same time slot as it came in). The output of the adder circuit 65 thus has the valve (WA-63), whereas each time slot of the blocks 42 has the value (WA-63+relative read address), in which the relative read address is within a certain range depending on the time slot, as stated above. In addition, the contents of the address control memory must be interpreted at columns 13 to 18 (cf. the above table); i.e. it must be verified whether the switching instruction is reasonable. If other columns than columns 13 to 15 are addressed during these columns, the instruction is not reasonable, and a column relating to any TU-3 signal cannot be concerned. The same applies to columns 16 to 18 as well. If the switching instruction is not reasonable, the null pointer indicator NPI is generated into columns 13 to 15, and correspondingly fixed stuff into columns 16 to 18. If the instruction is a reasonable TU-3 level switching instruction, it may be part of a TU-3 or TU-2 switching instruction, or it may be a TU-12 switching instruction. The column in question can be switched in any case, for if a TU-2 or TU-12 signal is switched by a TU-3-type instruction, it is switched from an incoming TUG-3 unit, which in this case cannot contain a TU-3 signal. Therefore it does not matter if the location of the null pointer indicator should change.

FIG. 8 shows an example of the contents of the address control memory when the basic switching block comprises a combination of signals of different levels of hierarchy (which may be of any kind, depending on how a single STM-1 frame can be assembled, cf. FIG. 3). In this case, the same instruction has been copied into each TU-3 channel at intervals of three memory locations, into each TU-2 channel at intervals of 21 memory locations, and each TU-12 channels has only one switching instruction.

Figure 9:
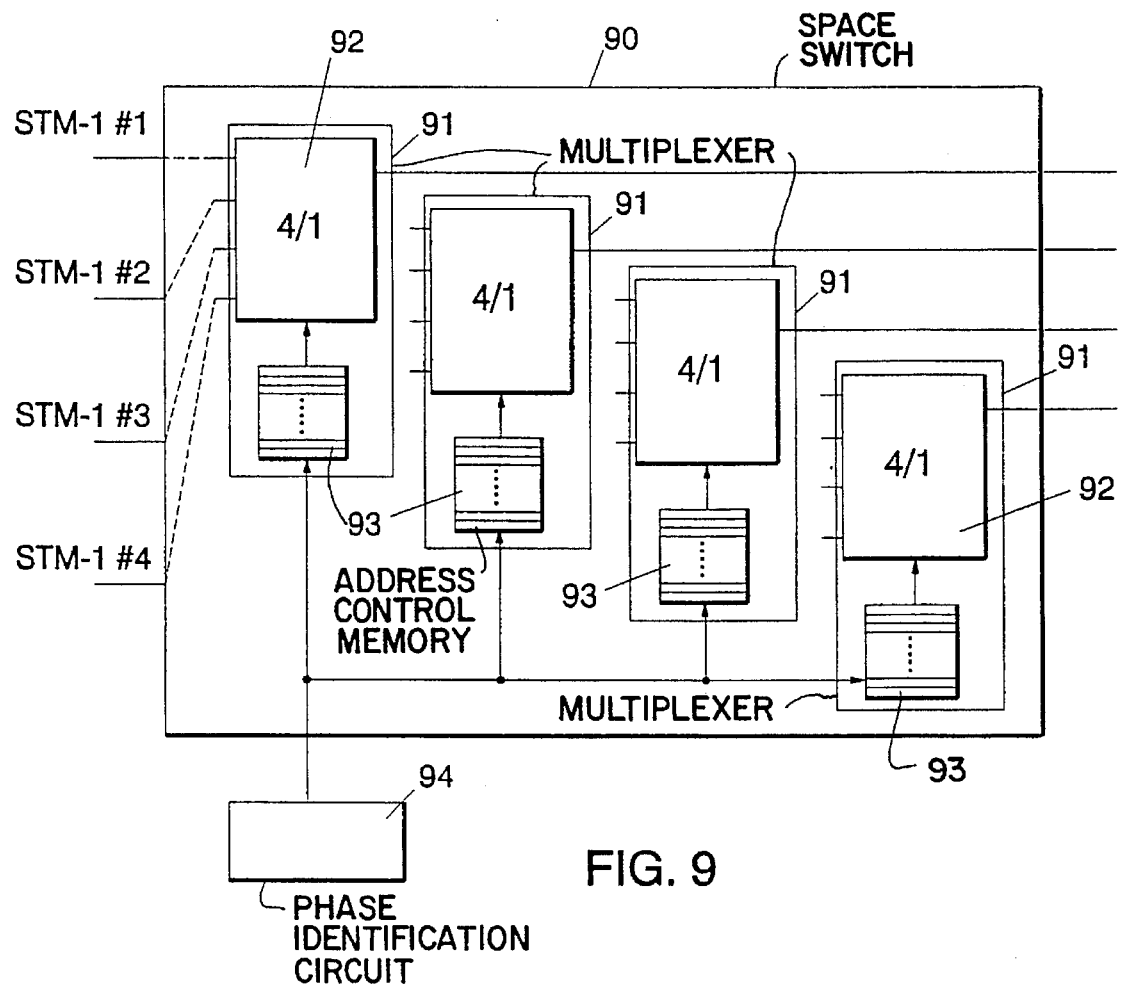
FIG. 9 shows a solution of the invention as applied to a space switch.

The solution of the invention can also be used an a space switch 90 shown in FIG. 9. In the example, the space switch has four inputs and four outputs. It is provided with four multiplexer units 91, each of which comprises a 4/1 multiplexer 92 and an address control memory 93. The inputs of each multiplexer 92 are connected to the corresponding input of the space switch (shown in the figure merely with respect to the first multiplexer), and the output of each multiplexer forms one of the outputs of the space switch. Each 4/1 multiplexer is controlled by a separate address control memory 93. In this case, a single address control memory has 63 memory locations, and the switching data are grouped according to FIGS. 7A, 7B and 8. In this case, the most preferable form of a switching instruction is, however, not the relative read address but the absolute address, i.e. the number of the incoming STM-1 signal (the number of the input line), which in this case is from 1 to 4. This number indicates the STM-1 signal the byte of which is switched at that particular moment to the output of the multiplexer. When the STM-1 frame begins, the reading of the switching instruction words is started one time slot at a time. This is continued until the instruction word 18, whereafter the process returns to the beginning, and all the 63 instruction words are read. This is effected four times, whereafter a new STM-1 frame begins. During columns 1 to 12 the switching data is always skipped, i.e. cross-connection is not performed but the data is switched straight through (the bytes of the first input are switched to the first output, the bytes of the second input to the second output, etc.). Information on the phase of the frame is received from a phase identification circuit 94. In the space switch, columns 13 to 18 need not be interpreted as in the case of the time switch, since in the space switch erroneous switching cannot be performed in the same way as in the time switch.

As the space switch is known per se, it will not be described here in greater detail.

Even though the invention has been described above with reference to the examples shown in the attached drawings, it is obvious that the invention is not restricted to them but may be modified in various ways within the inventive idea disclosed above and in the accompanying claims. Even though the invention has been described with reference to an SDH specific STM-1 signal, the solution of the invention can also be used in connection with any time division multiplex signal.

References:

[1] CCITT Blue Book, Recommendation G.709: "Synchronous Multiplexing Structure", May 1990.

[2] SDH—Ny digital hierarki, TELE 2/90.

[3] CCITT Blue Book, Recommendation G.783: "Characteristics of Synchronous Digital Hierarchy (SDH) Multiplexing Equipment Functional Blocks," August 1990, Annex B.

We claim:

1. A method for implementing time switching for signals of several different levels of hierarchy, said signals having a common frame structure, comprising:

writing the contents of the time slots of an incoming signal into a memory at respective memory locations determined by a respective write address; and reading said contents from said memory at the memory locations indicated by switching data contained in an address control memory defining a basic switching block on the basis of the frame structure of said incoming signal so that the number of consecutive time slots of said basic switching block corresponds to the greatest possible number of signals of the lowest level of hierarchy to be switched, said basic switching block recurring in the frame structure of said incoming signal;

the number of switching instructions to be stored in the address control memory corresponding to the size of the basic switching block, and when the basic switching block also contains signals of a higher level of hierarchy than said lowest level, the same switching instruction being used in said address control memory at given intervals, depending on how often said signals of a higher level occur in the basic switching block, and the same address control memory being read during the entire frame structure, and giving a switching instruction to all time slots in the frame, and the switching instructions read from the address control memory being skipped during time slots which are not cross-connected.

2. A method according to claim 1, wherein:

each said switching instruction is a relative read address, which indicates the relative transition of the data contained in a respective time slot within the frame structure, and forcing each respective switching instruction to become zero during the time slots which are not cross-connected.

3. A method for implementing switching in the space domain for signals of several different levels of hierarchy, said signals having a common frame structure, comprising:

effecting switching on the basis of switching data included in an address control memory; and defining a basic switching block on the basis of an incoming frame structure so that the number of consecutive time slots of the basic switching block corresponds to the greatest possible number of signals of the lowest level of hierarchy to be switched, said basic switching block recurring in the frame structure of said incoming signal;

the number of switching instructions to be stored in the address control memory corresponding to the size of the basic switching block, and when the basic switching block also contains higher-level signals, using the same switching instruction in the address control memory at given intervals, depending on how often said higher-level signals occur in the basic switching block, and the same address control memory being read during the entire frame structure, and giving a switching instruction to all time slots in the frame, and the switching instructions read from the address control memory being skipped during time slots which are not cross-connected.

* * * * *